(12) United States Patent
Parry, Jr. et al.

(10) Patent No.: US 10,115,322 B2
(45) Date of Patent: Oct. 30, 2018

(54) TORSO SIMULANT WITH VASCULAR ELEMENTS MECHANICALLY RESPONSIVE TO A TOURNIQUET

(71) Applicant: Techline Technologies, Inc., Willow Grove, PA (US)

(72) Inventors: David J. Parry, Jr., Yardley, PA (US); Daniel J. Parry, Perkasie, PA (US); Jonathan A. Closeme, Lansdale, PA (US); Colin R. Harris, Media, PA (US)

(73) Assignee: Techline Technologies, Inc., Willow Grove, PA (US)

( * ) Notice: Subject to any disclaimer, the term of this patent is extended or adjusted under 35 U.S.C. 154(b) by 518 days.

(21) Appl. No.: 15/045,295

(22) Filed: Feb. 17, 2016

(65) Prior Publication Data

US 2016/0171911 A1  Jun. 16, 2016

Related U.S. Application Data

(63) Continuation-in-part of application No. 13/925,949, filed on Jun. 25, 2013, now Pat. No. 9,280,917, which is a continuation-in-part of application No. 13/532,848, filed on Jun. 26, 2012, now Pat. No. 8,491,309, which is a continuation-in-part of (Continued)

(51) Int. Cl.
*G09B 23/28* (2006.01)
*G09B 23/30* (2006.01)

(52) U.S. Cl.
CPC .......... *G09B 23/303* (2013.01); *G09B 23/30* (2013.01)

(58) Field of Classification Search
CPC ...... G09B 23/303; G09B 23/30; G09B 23/34; G09B 9/00
USPC ......................................... 434/272, 267, 268
See application file for complete search history.

(56) References Cited

U.S. PATENT DOCUMENTS 2,689,415 A * 9/1954 Haver .................. G09B 23/285
434/272
5,795,157 A * 8/1998 Weber .................. G09B 23/285
434/269

(Continued)

*Primary Examiner* — Sam Yao
*Assistant Examiner* — Lily M Del Valle
(74) *Attorney, Agent, or Firm* — Michael Crilly, Esquire (57) ABSTRACT

A torso simulant for use as a training device for stemming blood flow is presented. The simulant includes a mandrel, a compressible tube(s), a plate, a patch, a compressible layer, and a structure(s). The mandrel includes an exterior surface simulating at least a portion of a trunk. The compressible tube simulates a vascular element. The plate partially covers the mandrel and the compressible tube so that the compressible tube is disposed between the mandrel and the plate. The plate is movable toward the mandrel enabling compression of the compressible tube when a force is applied onto the plate. The patch completely covers the plate and partially covers the mandrel and the compressible tube. The patch is secured to the mandrel about a perimeter of the plate. The compressible tube extends from under the patch. The compressible layer covers the mandrel, the compressible tube and the patch. The compressible layer simulates skin. The structure is disposed along the compressible layer to simulate an injury. The compressible tube communicates a liquid to the structure.

20 Claims, 7 Drawing Sheets

Related U.S. Application Data application No. 12/131,980, filed on Jun. 3, 2008, now Pat. No. 8,221,129.

(60) Provisional application No. 61/681,856, filed on Aug. 10, 2012.

(56) References Cited

U.S. PATENT DOCUMENTS

| | | | |
|---|---|---|---|
| 2009/0011394 A1* | 1/2009 | Meglan | G09B 23/28 434/268 |
| 2010/0062408 A1* | 3/2010 | Speller | G09B 23/285 434/262 |
| 2011/0008760 A1* | 1/2011 | Bevan | G09B 23/28 434/268 |
| 2012/0003621 A1* | 1/2012 | Segall | G09B 23/28 434/272 |
| 2014/0030682 A1* | 1/2014 | Thilenius | G09B 23/30 434/219 |
| 2017/0193858 A1* | 7/2017 | Segall | G09B 23/303 |

* cited by examiner

TORSO SIMULANT WITH VASCULAR ELEMENTS MECHANICALLY RESPONSIVE TO A TOURNIQUET

CROSS REFERENCE TO RELATED APPLICATIONS

This application is a continuation-in-part of co-pending U.S. Non-Provisional application Ser. No. 13/925,949 filed Jun. 25, 2013 which claims priority to U.S. Provisional Application No. 61/681,856 filed Aug. 10, 2012 both entitled Simulant with Vascular Structure Mechanically Responsive to a Tourniquet; U.S. Non-Provisional application Ser. No. 13/925,949 is also a continuation-in-part of U.S. Non-Provisional application Ser. No. 13/532,848 filed Jun. 26, 2012 now U.S. Pat. No. 8,491,309 which is a continuation-in-part of U.S. Non-Provisional application Ser. No. 12/131,980 filed Jun. 3, 2008 now U.S. Pat. No. 8,221,129 both entitled Wearable Wound Simulant; all prior applications are hereby incorporated in their entirety by reference thereto.

FEDERALLY SPONSORED RESEARCH AND DEVELOPMENT

None.

BACKGROUND OF THE INVENTION

1. Field of the Invention

The invention generally relates to a device that simulates the appearance of and vascular function within a torso for medical training purposes. Specifically, the invention is a torso simulant with blast and/or penetration injuries suitable for use as a training device for stemming blood loss. The training simulant includes compressible areas that permit a tourniquet to collapse a compressible tube simulating vascular elements.

2. Background

Advancements in personal-protection technologies, examples including but not limited to helmets and body armor, have greatly reduced the frequency and severity of blast-induced and impact-related injuries. However, current technologies significantly compromise mobility when adapted to protection of the lower torso and legs. This means that soldiers are equipped with protective elements to prevent and to minimize injuries to both head and upper torso while leaving both lower torso and legs unprotected.

Enemy combatants are well aware of the technical limitations of and the tradeoffs imposed by personal-protection technologies. It is now common for improvised explosive devices (IEDs) to target the lower torso and/or the legs in pursuit of exploiting the absence of protective elements along these regions. Consequently, wounds to the lower trunk and legs are more frequent. While the damage cause by IEDs is often not immediately fatal, the resultant blood lose could be significant and may cause death.

An abdominal tourniquet is one tool used by soldiers to stem blood loss caused by penetrating wounds and severed legs. One exemplary tourniquet is the Abdominal Aortic and Junctional Tourniquet (AAJT) sold by Compression Works, LLC located in Hoover, Ala. The AAJT and other similar tourniquets are placed about the lower torso and properly positioned to apply a compressive force onto vascular elements within the torso in order to stem blood flow to and from injuries along the lower trunk and legs.

Successful use of an abdominal tourniquet is wound specific and therefore inherently difficult to properly implement. For example, a user must properly identify the compromised vascular element(s), properly identify the area(s) onto which pressure is applied to stem blood loss, and properly apply the appropriate pressure without causing additional injury to and/or death of the injured person.

Mannequins replicating the torso and other body parts are available for training soldiers as to the treatment techniques required to stabilize a wounded soldier. Mannequins replicate the appearance and properties of flesh, tissues, and organs, as well as injuries thereto. Mannequins may include tubes which allow a liquid simulating blood to flow to and out of an injury representative of an impact wound or a blast-induced wound. Presently know training devices are problematic for at least the following reasons.

The torso region of mannequins fails to realistically simulate the mechanical response of skeletal elements, flesh, tissues, and vascular elements to the compression applied by a tourniquet. For example, it is common for the compressible materials surrounding a vascular simulant to locally move in the direction of the applied force thus compressing the materials surrounding the vascular simulant without closing the vascular simulant and without choking blood flow. The result is functionality that does not accurately correspond to the mechanical response of a torso after application of pressure by a tourniquet, thus negating the training value of mannequins.

In U.S. patent application Ser. No. 13/925,949 entitled Simulant with Vascular Structure Mechanically Responsive to a Tourniquet, a simulant is described including a compressible body, a structure, a compressible tube, and a pair of plates. The compressible body simulates the appearance and properties of a body part. The structure simulates an injury disposed along the compressible body. The compressible tube simulates a vascular element, examples including but not limited to an artery or a vein. The plates are disposed within the compressible body and separately disposed about the compressible tube. The plates are rigid and configured to deform the compressible tube when a compressive force is applied onto the compressible body by a tourniquet or the like. The compressible body and plates are cast separately and the plates are inserted into a preformed cavity within the compressible body.

Unlike the simulant in the aforementioned patent application, the compressible body or outer layer disposed about a torso simulant must be directly cast onto rigid plates and vascular elements in order to properly simulate the appearance of the torso simulant, to properly simulate the functionality of the torso simulant, and to properly conceal vascular elements and pressure responsive areas along the torso simulant. The direct cast methodology is problematic because the liquid resin forming the compressible outer layer flows into the space between the rigid plates. After the resin cures, the solid, yet compressible resin resists closure between the plates and prevents proper compression and collapse of the vascular elements there between.

Accordingly, what is required is a torso simulant with blast and/or penetration injuries suitable for use as a training device for stemming blood loss that simulates the appearance, compressive properties, blood flow paths, and pressure responsive areas of a human torso.

Accordingly, what is required is a fabrication method for a torso simulant with blast and/or penetration injuries suitable for use as a training device for stemming blood loss whereby a resin is directly cast onto rigid elements disposed about a vascular simulant without impairing the mechanically-inducible compression of the vascular simulant by the rigid elements.

SUMMARY OF THE INVENTION

An object of the invention is a torso simulant with blast and/or penetration injuries suitable for use as a training device for stemming blood loss that simulates the appearance, compressive properties, blood flow paths, and pressure responsive areas of a human torso.

An object of the invention is a fabrication method for a torso simulant with blast and/or penetration injuries suitable for use as a training device for stemming blood loss whereby a resin is directly cast onto rigid elements disposed about a vascular simulant without impairing the mechanically-inducible compression of the vascular simulant by the rigid elements.

In accordance with embodiments of the invention, the torso simulant includes a mandrel, at least one compressible tube, a plate, a patch, a compressible layer and at least one structure. The mandrel includes an exterior surface which simulates the appearance of at least a portion of a trunk. The compressible tube(s) simulates a vascular element. The plate partially covers the mandrel and the compressible tube(s) so that the compressible tube(s) is disposed between the mandrel and the plate. The plate is movable toward the mandrel enabling compression of the compressible tube(s) when a force is communicated onto the plate. The patch completely covers the plate and partially covers the mandrel and the compressible tube(s). The patch is secured to the mandrel about a perimeter of the plate. The compressible tube(s) extends from under the patch. The compressible layer covers the mandrel, the compressible tube(s) and the patch. The compressible layer simulates skin. The structure(s) is disposed along the compressible layer to simulate an injury. The compressible tube(s) communicates a liquid to the structure(s).

In accordance with other embodiments of the invention, the mandrel includes an interior surface which defines a cavity.

In accordance with other embodiments of the invention, a pump communicates the liquid to the compressible tube(s).

In accordance with other embodiments of the invention, the pump is either disposed within a cavity defined by an interior surface along the mandrel or exterior to the mandrel.

In accordance with other embodiments of the invention, the pump communicates the liquid from a reservoir.

In accordance with other embodiments of the invention, the reservoir is either disposed within a cavity defined by an interior surface along the mandrel or exterior to the mandrel.

In accordance with other embodiments of the invention, the liquid simulates blood.

In accordance with other embodiments of the invention, the exterior surface further defines a leg extending from the trunk.

In accordance with other embodiments of the invention, the leg is defined at least in part and a bone replica extends from the compressible layer.

In accordance with other embodiments of the invention, the mandrel and the plate contain a urethane-based resin.

In accordance with other embodiments of the invention, the compressible layer, the compressible tube(s), and the patch contain a silicone-based resin.

In accordance with other embodiments of the invention, the structure(s) contains a silicone-based resin or a urethane-based resin.

In accordance with other embodiments of the invention, a cover panel is attachable to the mandrel to conceal a cavity defined by an interior surface along the mandrel.

In accordance with other embodiments of the invention, the structure(s) includes a stem extending from a flange. The compressible tube(s) is attached to the stem so as to communicate the liquid into the structure(s). The flange is secured to the mandrel.

In accordance with other embodiments of the invention, the stem resides within a pocket disposed along the mandrel.

In accordance with embodiments of the invention, the method of fabricating a torso simulant for use as a training device includes the steps of attaching a compressible tube to a mandrel, covering the compressible tube and the mandrel with a plate, placing a patch onto the plate and the mandrel, securing the patch to the mandrel about a perimeter of the plate, and preventing a resin comprising the compressible layer from entering between the mandrel and the plate. The resin is directly applied to the patch and the mandrel. The compressible tube simulates a vascular element. The mandrel simulates a trunk. The plate partially covers the compressible tube and the mandrel. The patch completely covers the plate and partially covers an exterior surface along the mandrel. The plate resides within a pocket formed between the patch and the mandrel.

In accordance with other embodiments of the invention, an adhesive attaches the compressible tube to the mandrel in the attaching step.

In accordance with other embodiments of the invention, an adhesive secures the patch to the mandrel in the securing step.

In accordance with other embodiments of the invention, the patch prevents the resin from entering between the mandrel and the plate in the preventing step.

In accordance with other embodiments of the invention, the securing step includes securing the patch to the compressible tube where the compressible tube traverses the perimeter.

Several advantages are offered by the invention. The invention provides a torso simulant with blast and/or penetration injuries suitable for use as a training device for stemming blood loss that simulates the appearance, compressive properties, blood flow paths, and pressure responsive areas of a human torso. Furthermore, the invention provides a fabrication method for a torso simulant with blast and/or penetration injuries suitable for use as a training device for stemming blood loss whereby a resin is directly cast onto rigid elements disposed about a vascular simulant without impairing the mechanically-inducible compression of the vascular simulant by the rigid elements.

The above and other objectives, features, and advantages of the preferred embodiments of the invention will become apparent from the following description read in connection with the accompanying drawings, in which like reference numerals designate the same or similar elements.

BRIEF DESCRIPTION OF THE DRAWINGS

Additional aspects, features, and advantages of the invention will be understood and will become more readily apparent when the invention is considered in the light of the following description made in conjunction with the accompanying drawings.

DETAILED DESCRIPTION OF THE INVENTION

Reference will now be made in detail to several embodiments of the invention that are illustrated in the accompanying drawings. Wherever possible, same or similar reference numerals are used in the drawings and the description to refer to the same or like parts. The drawings are in simplified form and are not to precise scale.

While features of various embodiments are separately described throughout this document, it is understood that two or more such features could be combined into a single embodiment.

Figure 1:
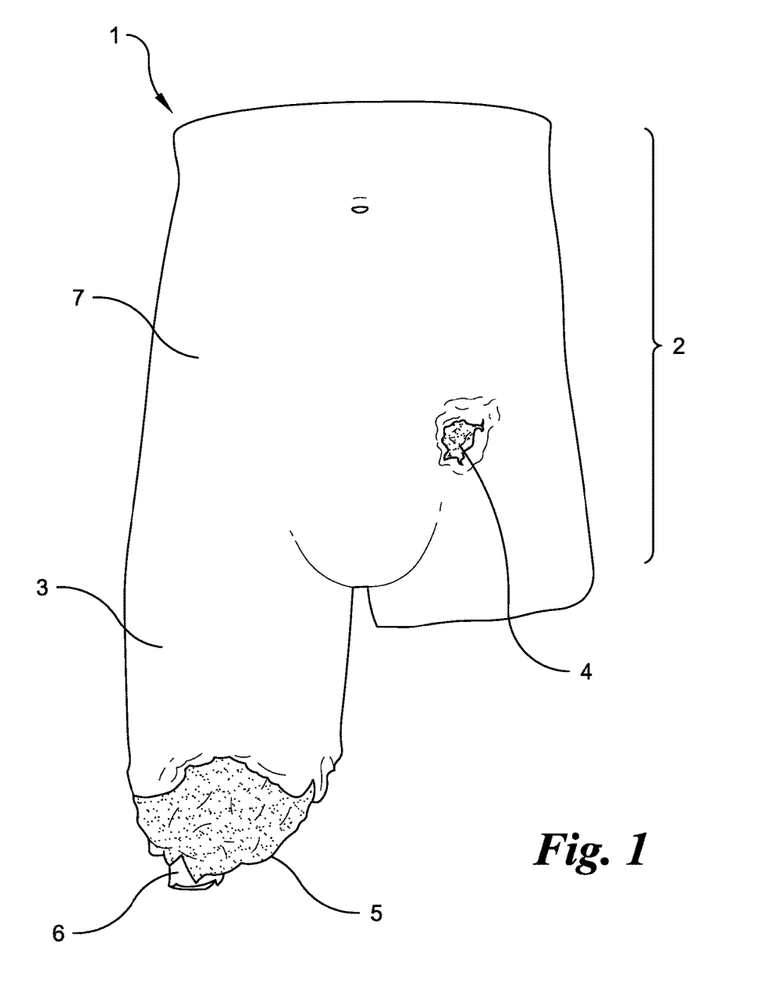
FIG. 1 is a front side view illustrating a torso simulant with optional gunshot wound and optional partially severed right leg with a partially exposed bone replica (optional left leg not shown on simulant) in accordance with an embodiment of the invention.

Referring now to FIG. 1, the torso simulant 1 is shown with a trunk 2 and an optional leg 3. The trunk 2 is understood to refer to the region of a human body, either in part or whole, between a head and legs. The torso simulant 1 may include none, one, or two legs 3. A compressible layer 7 simulates the appearance of human skin along the trunk 2 and the optional leg 3. The torso simulant 1 may include one or more structures 4, 5 that simulate the appearance of a wound with bleed functionality. For example, the structure 4 along the lower end of the trunk 2 simulates a gunshot wound. In another example, the structure 5 is located along the leg 3 to simulate a severed limb with an optional bone replica 6 extending therefrom. Each structure 4, 5 may be fabricated from one or more rigid and/or non-rigid resins, examples including urethane-based resins and silicone-based resins. The appearance, functionality, and location of the structure(s) 4, 5 described herein are exemplary and therefore do not limit the types of injuries applicable to the present invention.

Figure 2:
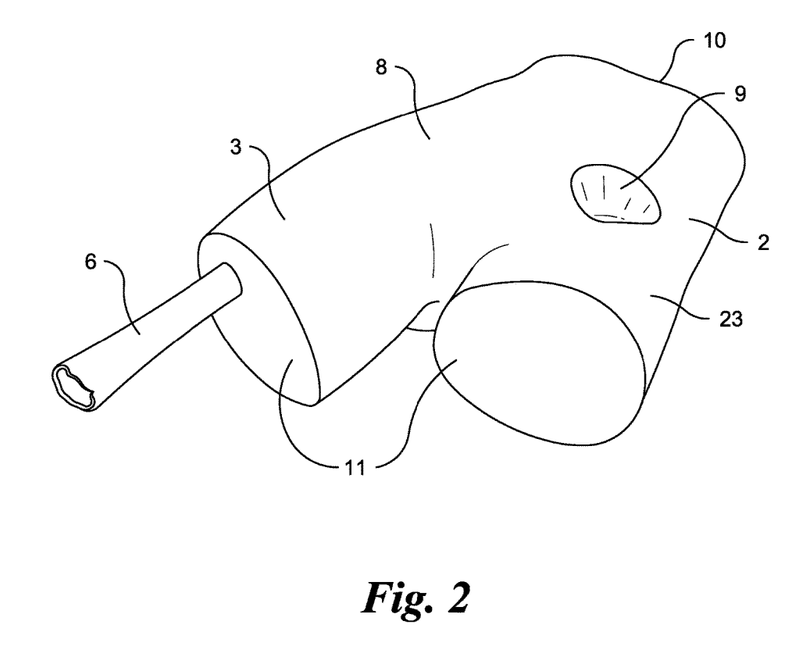
FIG. 2 is a perspective view illustrating a mandrel that supports an outer compressible layer (not shown) with an optional pocket along a trunk region which supports a structure defining a gunshot and an optional bone replica attached at one end of the mandrel for inclusion within a structure defining a severed leg in accordance with an embodiment of the invention.

Referring now to FIGS. 1 and 2, the torso simulant 1 includes a mandrel 8 and a compressible layer 7. The compressible layer 7 is disposed about and attached to the mandrel 8. The mandrel 8 further includes an exterior surface 23 which in combination with the compressible layer 7 defines the exterior shape of the trunk 2 and the leg 3. The mandrel 8 may be comprised of a urethane-based resin molded via methods understood in the art. The mandrel 8 is at least substantially rigid to approximate the rigidity associated with organs, tissues, and bones within a torso and limbs. The mandrel 8 has an upper end 10 and a lower end 11. The mandrel 8 may further include one or more optional pockets 9 that permit assembly of a wound onto the torso simulant 1. Optional elements may be attached to the mandrel 8 to simulate the appearance of bones, organs, and/or tissues. For example, one end of a bone replica 6 configured as a thigh bone could engage the mandrel 8 at the lower end 11 so as to extend from one leg 3. The bone replica 6 may be secured to the mandrel 8 via an adhesive or a mechanical fastener or may be molded onto the mandrel 8. The bone replica 6 could be partially or completely covered by the compressible layer 7 which simulates the appearance and compressibility of flesh disposed about the leg 3.

Referring again to FIGS. 1 and 2, the compressible layer 7 is comprised of a cold-cast resin cured to form a compressible layer representative of human skin with or without sublayers thereto. One non-limiting, exemplary material is a silicone-based resin. The resin may include one or more additives that approximate surface and subsurface coloring. The resin is directly applied to the mandrel 8 to a thickness profile that simulates the desired appearance and physical properties. The resin may be applied onto one or more tear resistant layers along the mandrel 8 thereby embedding the layer(s) within the compressible body 7. Non-limiting examples of compressible layers 7 with and without reinforcement are described in U.S. Pat. Nos. 8,221,129 and 8,491,309 both entitled Wearable Wound Simulant, which are incorporated herein in their entirety.

Figure 3:
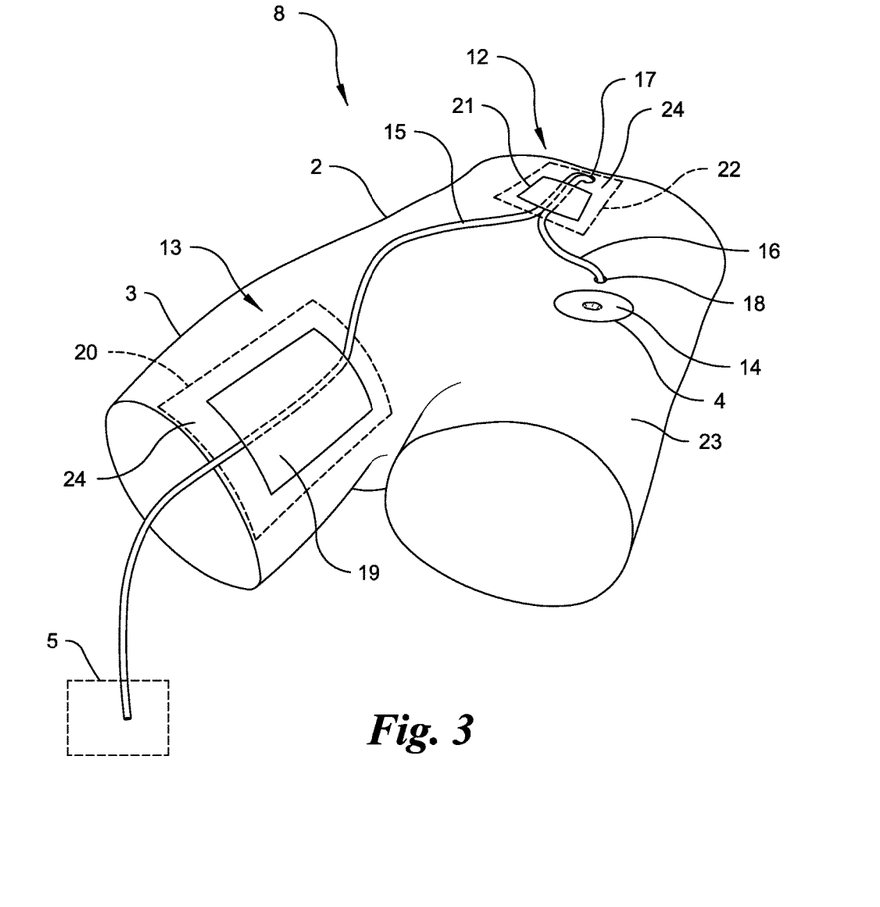
FIG. 3 is a perspective view illustrating a pair of compressible tubes (as viewed through plates and patches), a pair of plates (as viewed through patches), a pair of patches, and wounds disposed along a mandrel whereby each plate partially covers at least one compressible tube and the mandrel, each patch completely covers a plate, each patch partially covers a compressible tube, and each patch partially covers the mandrel in accordance with an embodiment of the invention.

Referring now to FIG. 3, at least one compressible tube 15, 16 is provided along and secured to the exterior surface 23 of the mandrel 8. The compressible tube 15, 16 should be composed of a material that adequately models the deformation and resiliency of a vascular element. The compressible tube 15, 16 should be deformable so as to collapse when a compressive force is communicated onto the compressible layer 7 and resilient so as to recover its original shape after a compressive force is removed from the compressible layer 7. One non-limiting, exemplary material is a silicone-based resin. Other design parameters, such as length and diameter of the compressible tube 15, 16 and location along the mandrel 8, are dictated by the vascular element simulated by each compressible tube 15, 16. For example, a compressible tube 15 could be sized and positioned to approximate an artery that traverses a trunk 2 and a leg 3, as illustrated in FIG. 3. In another example, a compressible tube 16 could be sized and positioned to approximate an artery within a trunk 2 only, also shown in FIG. 3. The compressible tubes 15, 16 should be properly sealed and leakage proof so as to permit communication of a liquid between a source and an end point, the latter typically within a structure 4, 5. The liquid could simulate a body fluid, such as human blood.

Referring again to FIG. 3, each compressible tube 15, 16 is positioned along the exterior surface 23 so as to intersect and traverse at least one compressible area 12, 13. For example, one compressible tube 15 could intersect and traverse a first compressible area 12 along the trunk 2 and a second compressible area 13 along the leg 3. In another example, one compressible tube 16 could traverse a compressible area 12 within the trunk 2 or leg 3, the former shown in FIG. 3. The upstream end of each compressible tube 15, 16 could communicate with a pump or the like to ensure a continuous stream of a liquid through the tubes 15, 16. The downstream end of each compressible tube 15, 16 could terminate at a structure 4, 5, respectively. The compressible tubes 15, 16 may pass through one or more holes 17, 18 along the mandrel 8 to facilitate upstream and downstream terminations as required by the design.

Figure 4:
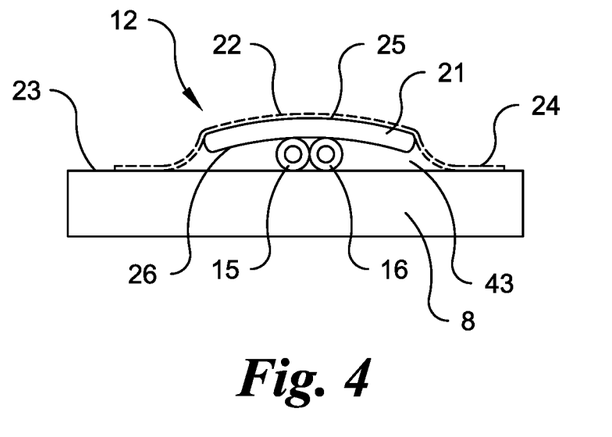
FIG. 4 is an enlarged cross section view illustrating a pair of tubes disposed between a plate and a mandrel whereby the plate and the tubes are disposed within a pocket formed between a patch and the mandrel in accordance with an embodiment of the invention.

Referring now to FIGS. 3 and 4, the compressible area 12 along a trunk 2 could include a pair of compressible tubes 15, 16, a plate 21, and a patch 22. The compressible tubes 15, 16 are disposed along and contact the exterior surface 23 of the mandrel 8. The plate 21 is positioned along the compressible tubes 15, 16 so that the lower surface 26 of the plate 21 contacts both compressible tubes 15, 16. This arrangement places the compressible tubes 15, 16 between the mandrel 8 and the plate 21 so that the plate 21 partially covers both the compressible tubes 15, 16 and the mandrel 8. A patch 22 is disposed along and contacts the exterior surface 23 of the mandrel 8 and the upper surface 25 of the plate 21. This arrangement positions a portion of the plate 21 between the compressible tubes 15, 16 and the patch 22 and the remaining portion of the plate 21 between the patch 22 and the mandrel 8. The patch 22 completely covers the upper surface 25 of the plate 21, partially covers the exterior surface 23 of the mandrel 8, and partially covers a lengthwise portion of both compressible tubes 15, 16.

Referring again to FIGS. 3 and 4, the patch 22 is secured to the exterior surface 23 about the perimeter 24 of the plate 21. In preferred embodiments, the patch 22 could be attached to the mandrel 8 via an adhesive. In other embodiments, the patch 22 may also be attached to the compressible tubes 15, 16 within the perimeter 24 and/or the upper surface 25 of the plate 21. The patch 22 is secured to the mandrel 8 so that the compressible tubes 15, 16 extend between and from the patch 22 and mandrel 8 at two locations along the perimeter 24. This arrangement provides a continuous pathway whereby a liquid is communicated from an upstream source, across the compressible area 12, and to one or more downstream structures 4, 5.

Referring again to FIG. 4, the arrangement between the patch 22 and the mandrel 8 forms a pocket 43. The plate 21 is disposed within the pocket 43 and thereby secured to the mandrel 8. The plate 21 may be comprised of a resin which is at least substantially rigid, one non-limiting example being a cold-cast, urethane-based resin. The patch 22 may be comprised of a flexible, compressible resin. One non-limiting, exemplary material is a silicone-based resin. The patch 22 and the plate 21 should move toward the mandrel 8 when a compressive force is applied onto the patch 22 via the compressible layer 7 and should allow the patch 22 and the plate 21 to return to their respective starting positions after the compressive force is removed from the patch 22. The mandrel 8 should be sufficiently stiff and rigid so as to resist compression and/or deformation immediately below the compressible tubes 15, 16, thereby ensuring collapse and closure of the compressible tubes 15, 16. The result is a pinching of the compressible tubes 15, 16 between and by the plate 21 and the mandrel 8 so as to either reduce or completely terminate flow of a liquid through the compressible tubes 15, 16. This functionality ensures closure of the compressible tubes 15, 16 when a tourniquet is applied to the compressible layer 7 within a compressible area 12 and opening of the compressible tubes 15, 16 when a tourniquet is removed from the compressible layer 7.

Figure 5:
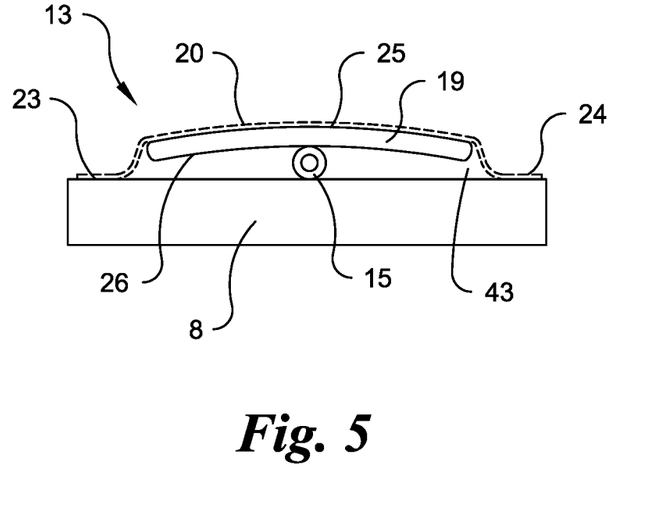
FIG. 5 is an enlarged cross section view illustrating a tube disposed between a plate and a mandrel whereby the plate and the tube are disposed within a pocket formed between a patch and the mandrel in accordance with an embodiment of the invention.

Referring now to FIGS. 3 and 5, the compressible area 13 along a leg 3 could include a compressible tube 15, a plate 19, and a patch 20. The compressible tube 15 is disposed along and contacts the exterior surface 23 of the mandrel 8. The plate 19 is positioned along the compressible tube 15 so that the lower surface 26 of the plate 19 contacts the compressible tubes 15. This arrangement places the compressible tube 15 between the mandrel 8 and the plate 19 so that the plate 19 partially covers both the compressible tube 15 and the mandrel 8. A patch 20 is disposed along and contacts the exterior surface 23 of the mandrel 8 and the upper surface 25 of the plate 19. This arrangement positions a portion of the plate 19 between the compressible tube 15 and the patch 20 and the remaining portion of the plate 19 between the patch 20 and the mandrel 8. The patch 20 completely covers the upper surface 25 of plate 19, partially covers the exterior surface 23 of the mandrel 8, and partially covers a lengthwise portion of the compressible tube 15.

Referring again to FIGS. 3 and 5, the patch 20 is secured to the exterior surface 23 about the perimeter 24 of the plate 19. In preferred embodiments, the patch 20 could be attached to the mandrel 8 via an adhesive. In other embodiments, the patch 20 may be attached to the compressible tube 15 within the perimeter 24 and/or the upper surface 25 of the plate 19. The patch 20 is secured to the mandrel 8 so that the compressible tube 15 extends between and from the patch 20 and mandrel 8 at two locations along the perimeter 24. This arrangement provides a continuous pathway whereby a liquid is communicated from an upstream source, across the compressible area 13, and to the downstream structure 5.

Referring again to FIG. 5, the arrangement between the patch 20 and the mandrel 8 forms a pocket 43. The plate 19 is disposed within the pocket 43 and thereby secured to the mandrel 8. The plate 19 may be comprised of a resin which is at least substantially rigid, one non-limiting example being a cold-cast, urethane-based resin. The patch 20 may be comprised of a flexible resin. One non-limiting, exemplary material is a silicone-based resin. The plate 19 and the patch 20 should move toward the mandrel 8 when a compressive force is applied onto the patch 20 via the compressible layer 7 and should allow the plate 19 and patch 20 to return to their respective starting positions after the compressive force is removed. The mandrel 8 should be sufficiently stiff and rigid so as to resist compression and/or deformation immediately below the compressible tube 15, thereby ensuring collapse and closure of the compressible tube 15. The result is a pinching of the compressible tube 15 between and by the plate 19 and the mandrel 8 so as to either reduce or completely terminate flow of a liquid through the compressible tube 15. This functionality ensures closure of the compressible tube 15 when a tourniquet is applied to the compressible layer 7 within a compressible area 13 and opening of the compressible tube 15 when a tourniquet is removed from the compressible layer 7.

In some other embodiments, it might be advantageous for the lower surface 26 along a plate 19 or 21 and/or the exterior surface 23 along the mandrel 8 to include an uneven surface that contacts one or more compressible tubes 15, 16 at two or more points, as described in U.S. patent application Ser. No. 13/925,949 entitled Simulant with Vascular Structure Mechanically Responsive to a Tourniquet, which is incorporated herein in its entirety. The uneven surface could include waves or other features which vary the thickness along a plate 19 or 21 and/or mandrel 8. The uneven surface may increase the sensitivity of a compressible area 12 or 13 to the mechanical action of a tourniquet.

Figure 6A:
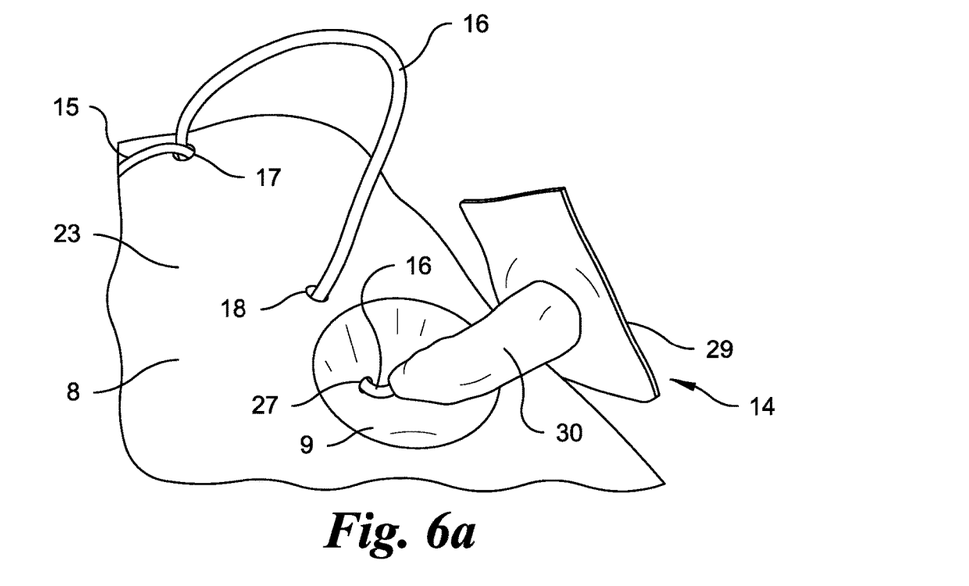
FIG. 6a is an enlarged perspective view illustrating a portion of a mandrel and a wound insert prior to assembly into a pocket along the mandrel whereby the wound insert includes a stem with a flange and a compressible tube attached at opposite ends thereof in accordance with an embodiment of the invention.
Figure 6B:
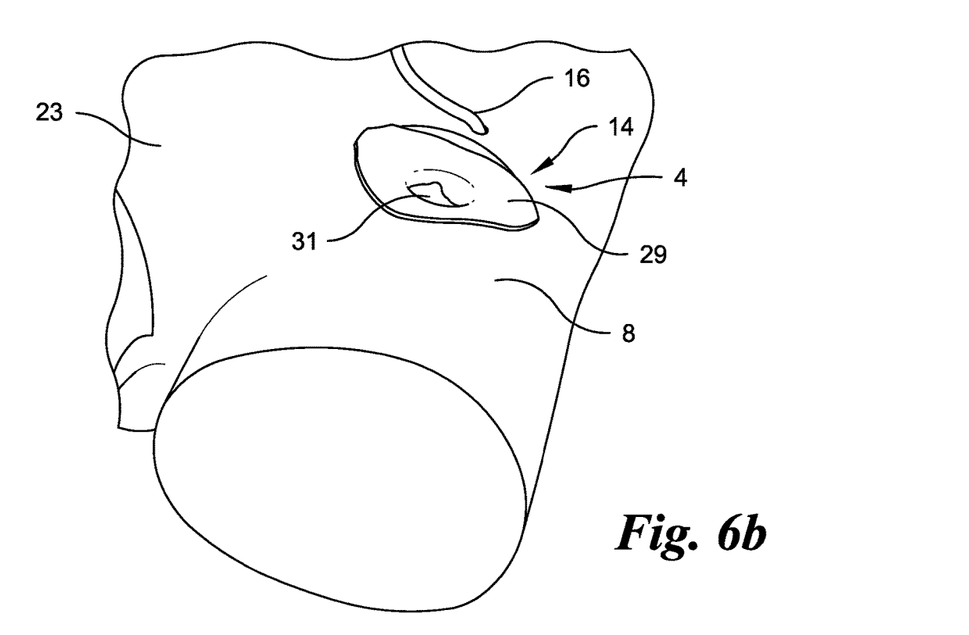
FIG. 6b is an enlarged perspective view illustrating the wound insert in FIG. 6a after assembly into the pocket along the mandrel in accordance with an embodiment of the invention.

Referring now to FIGS. 6a and 6b, a pocket 9 may be advantageous for proper assembly of a structure 4 onto the mandrel 8. The pocket 9 could be a depression or cavity that extends into the mandrel 8. The structure 4 could include a wound insert 14 which at least partially resides within the pocket 9. The wound insert 14 could include a stem 30 consisting of a tube-shaped element of uniform or variable diameter thereby defining a wound cavity 31. A flange 29 could be attached to and extend from one end of the stem 30. The flange 29 may cover the pocket 9 and a portion of the exterior surface 23 about the pocket 9. This arrangement permits the flange 29 to be secured to the exterior surface 23 via an adhesive or mechanical means, thereby concealing the stem 30 within the mandrel 8. A compressible tube 16 could be attached to the stem 30 at an end opposite of the flange 29. The compressible tube 16 could enter the mandrel 8 via a hole 18, traverse a portion of the mandrel 8 below the exterior surface 23, and enter the pocket 9 via a hole 27. An upstream length of compressible tube 16 may traverse a portion of the exterior surface 23 before passing into another hole 17. One or more compressible tubes 15, 16 may traverse the hole 17 and other such openings described herein. The compressible tube 16 may communicate a liquid to the stem 30 to simulate bleed function of a penetration-type wound.

Figure 7:
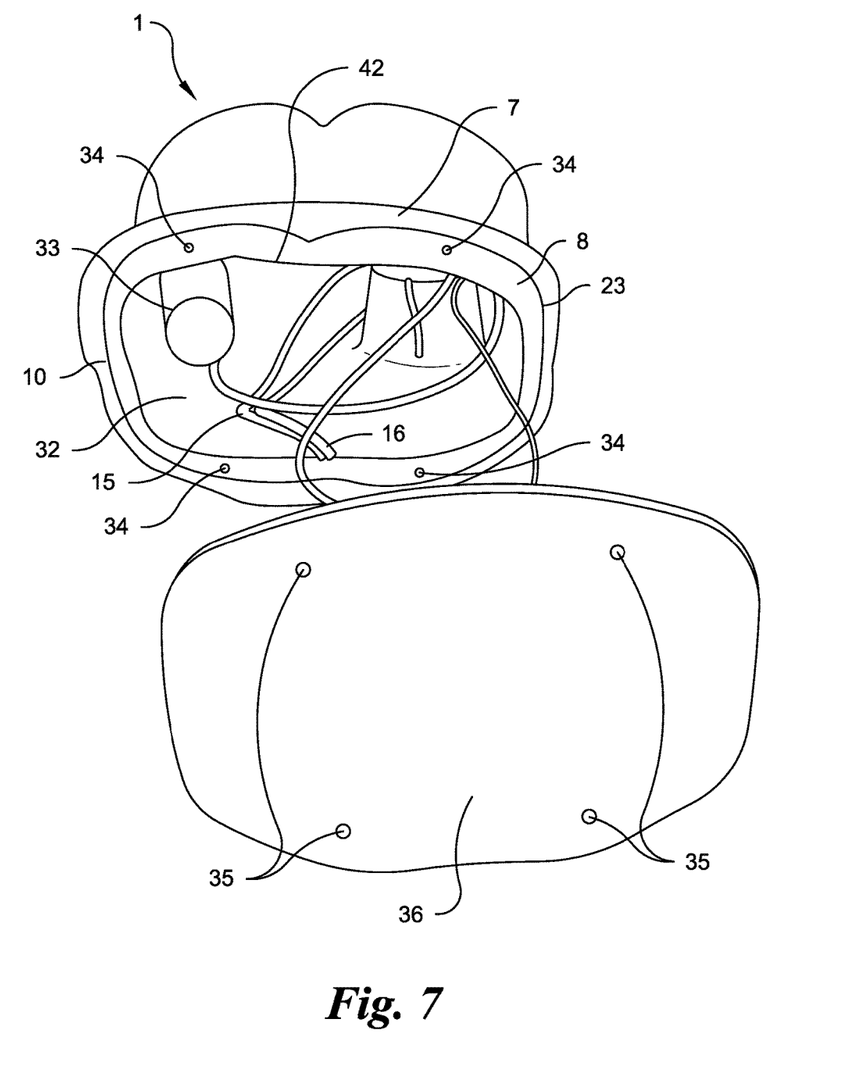
FIG. 7 is a top perspective view illustrating cross section of a mandrel with a cavity therein and a compressible layer disposed about the mandrel with a cover panel attachable to one end of the mandrel in accordance with an embodiment of the invention.

Referring now to FIGS. 3, 6a, and 7, the compressible layer 7 covers and conceals the compressible tubes 15, 16, the plates 19, 21, and the patches 20, 22. In some embodiments, the compressible layer 7 may conceal a portion of a structure 4 such as the flange 29 along the wound insert 14. Other portions of the structure 4 should be clearly visible along the compressible layer 7. The compressible layer 7 may include features which complement or accent the wound simulated by the structure 4. For example, the compressible layer 7 could be shaped and colored to approximate the appearance of compromised flesh disposed about a wound cavity 31.

Referring now to FIGS. 1 and 3, the compressible layer 7 in other embodiments may simulate features of a wound, such as the damaged flesh adjacent to a severed leg 3. The compressible layer 7 may be shaped and include pigmentation consistent with compromised tissues. The compressible tube 15 may also terminate at or near the surface of the compressible layer 7 to simulate a compromised vascular element and bleeding therefrom.

Referring now to FIG. 7, the mandrel 8 may include an optional cavity 32 defined generally by an interior surface 42 along the mandrel 8 whereby the mandrel 8 is disposed between the cavity 32 and the compressible layer 7. In some embodiments, a pump 33, reservoir 37, and/or power supply 38 (the latter two components shown in FIG. 8) may reside within the cavity 32 and communicate with the compressible tubes 15, 16. The compressible tubes 15, 16 may enter and exit the cavity 32 via the holes 17, 18, 27 described herein.

Referring again to FIG. 7, the upper end 10 of the torso simulant 1 may include an optional cover panel 36 that conceals and protects components disposed within the cavity 32. The cover panel 36 may be secured to the torso simulant 1 via two or more threaded fasteners (not shown) which separately pass through holes 35 along the cover panel 36 and engage threaded inserts 34 along the upper end 10 of the mandrel 8. The cover panel 36 may be composed of a material suitable to prevent access to and visual inspect of the cavity 32 within torso simulant 1. The cover panel 36 may include buttons, switches, indicator lights, LED or LCD displays, and the like that enable function and control of the pump 33, reservoir 37, power supply 38 and other elements supplying liquid to the structures 4, 5.

Referring now to FIGS. 4, 5, and 7, a compressive force may be applied to the exterior side of the compressible layer 7 causing the compressible layer 7 to compress and move toward and onto the plate 19 or 21 thereby communicating the compressive force onto the plate 19 or 21. In response to the compressive force, the plate 19 or 21 moves toward the mandrel 8 and communicates the compressive force onto the compressible tube 15 and/or 16. The compressible tube 15, 16 collapses when the compressive force communicated thereto exceeds the compressive strength of the tube 15, 16. The compressible tube 15, 16 remains collapsed so long as the compressive force applied thereto exceeds the compressive strength of the tube 15, 16. It may be possible in some embodiments to limit flow of a liquid through a compressible tube 15, 16 via a compressive force applied to an area along the torso simulant 1 other than the compressible areas 12, 13.

Figure 8:
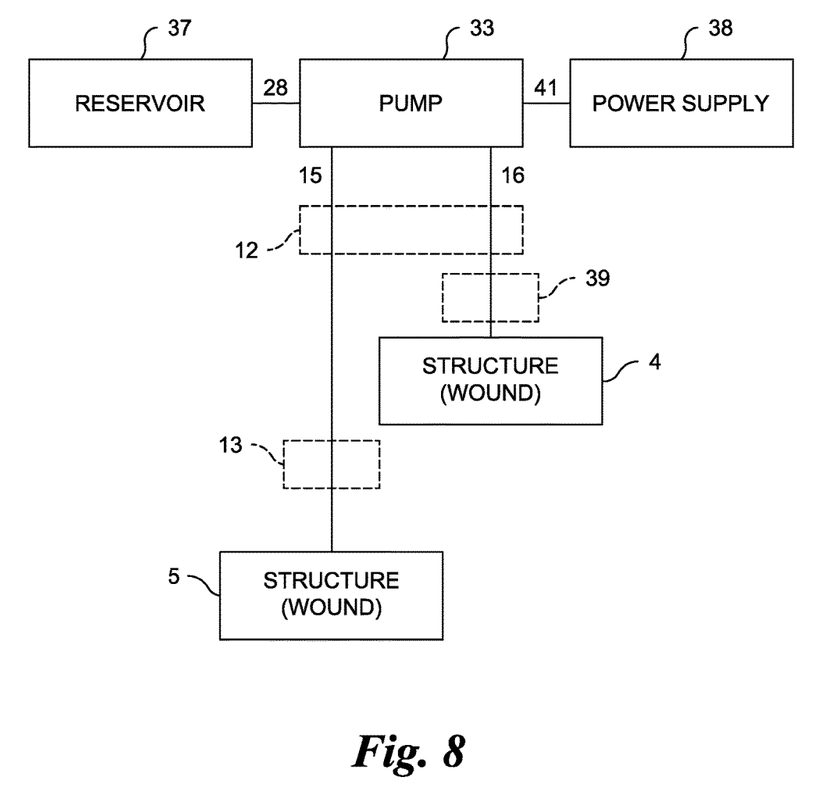
FIG. 8 is a block diagram illustrating electrical connectivity between a pump and a power supply and fluidic connectivity between a pump, a reservoir, and wounds in accordance with an embodiment of the invention.

Referring now to FIGS. 7 and 8, one exemplary embodiment of the torso simulant 1 may include a pump 33 communicable with a power supply 38 via an electrical connection 41. The power supply 38 may include a battery, a solar panel, a generator or other DC and/or AC source of electrical power. The power supply 38 and/or pump 33 are controllable via means understood in the art. The pump 33 may also communicate with a reservoir 37 via a tube 28. The pump 33, power supply 38, and/or reservoir 37 may reside within or adjacent to the torso simulant 1, the former placing one or more components within the cavity 32 and the latter placing one or more components outside of the mandrel 8. The pump 33 further communicates with the wound structures 4, 5 via the compressible tubes 15, 16, respectively. The compressible tubes 15, 16 traverse one or more compressible areas 12, 13, 39 along the torso simulant 1 between the pump 33 and wound structures 4, 5. The pump 33 communicates liquid from the reservoir 37 to the wound structures 4, 5 via the compressible tubes 15, 16.

The mandrel 8, compressible tubes 15, 16, plates 19, 21, and patches 20, 22 are separately manufactured via techniques understood in the art and then assembled to form the torso simulant 1.

Referring now to FIGS. 3 and 7, the torso simulant 1 is fabricated by attaching the compressible tubes 15, 16 to the mandrel 8. The compressible tubes 15, 16 may be attached to the mandrel 8 via an adhesive. A plate 19, 21 is then placed onto one or more compressible tubes 15, 16, thereby partially covering the compressible tubes 15, 16 and mandrel 8. A patch 20, 22 is then placed onto each plate 19, 21. The patch 20, 22 is larger than the plate 19, 21 allowing a portion of each patch 20, 22 to overlay and contact the mandrel 8. Each patch 20, 22 completely covers a plate 19, 21 and partially covers the exterior surface 23 of the mandrel 8. Each patch 20, 22 is secured to the mandrel 8 about the perimeter 24 of the plate 19, 21 via an adhesive. This arrangement forms a pocket 43 between each patch 20, 22 and the mandrel 8. A plate 19, 21 resides within each pocket 43 thereby securing each plate 19, 21 to the mandrel 8. The patch 20, 22 is secured to the mandrel 8 so as to eliminate and/or minimize pathways which could allow a resin comprising the compressible layer 7 to flow into the pocket 43 during and after application of the resin. In some embodiments, each patch 20, 22 could be further attached to the compressible tube 15, 16 to prevent infiltration of the resin between the plate 19, 21 and mandrel 8. The resin is directly applied to the exterior side of each patch 20, 22 and the exterior surface 23 of the mandrel 8 to the required thickness profile and then cured to form the compressible layer 7. The resin may be applied with or without the use of a mold. If a mold is used, then the interior surface of the mold is preferred to include the surface features and shape of the trunk 2 and the optional legs 3. Each patch 20, 22 prevents the resin comprising the compressible layer 7 from entering between the mandrel 8 and the plate 19, 21 so as to avoid impairment of the compressible areas 12, 13 whereby motion by a plate 19, 21 is impeded in the direction of the mandrel 8 by cured and/or uncured resin.

The description above indicates that a great degree of flexibility is offered in terms of the present invention. Although various embodiments have been described in considerable detail with reference to certain preferred versions thereof, other versions are possible. Therefore, the spirit and scope of the appended claims should not be limited to the description of the preferred versions contained herein.

What is claimed is:

1. A torso simulant for use as a training device for stemming blood flow comprising:
   (a) a mandrel including an exterior surface which simulates at least a portion of a trunk;
   (b) at least one compressible tube which simulates a vascular element;
   (c) a plate which partially covers said mandrel and said at least one compressible tube with said at least one compressible tube disposed between said mandrel and said plate, said plate movable toward said mandrel enabling compression of said at least one compressible tube when a force is communicated onto said plate;
   (d) a patch which completely covers said plate and partially covers said mandrel and said at least one compressible tube, said patch secured to said mandrel about a perimeter of said plate, said at least one compressible tube extends from under said patch;
   (e) a compressible layer which covers said mandrel, said at least one compressible tube and said patch, said compressible layer simulates skin; and
   (f) at least one structure disposed along said compressible layer to simulate an injury, said at least one compressible tube communicates a liquid to said at least one structure.

2. The torso simulant of claim 1, wherein said mandrel includes an interior surface which defines a cavity.

3. The torso simulant of claim 1, further comprising:
   (g) a pump which communicates said liquid to said at least one compressible tube.

4. The torso simulant of claim 3, wherein said pump is either disposed within a cavity defined by an interior surface along said mandrel or exterior to said mandrel.

5. The torso simulant of claim 3, further comprising:
   (h) a reservoir whereby said pump communicates said liquid from said reservoir.

6. The torso simulant of claim 5, wherein said reservoir is either disposed within a cavity defined by an interior surface along said mandrel or exterior to said mandrel.

7. The torso simulant of claim 1, wherein said liquid simulates blood.

8. The torso simulant of claim 1, wherein said exterior surface further defines a leg extending from said trunk.

9. The torso simulant of claim 8, wherein said leg is defined in part and a bone replica extends from said compressible layer.

10. The torso simulant of claim 1, wherein said mandrel and said plate contain a urethane-based resin.

11. The torso simulant of claim 1, wherein said compressible layer, said at least one compressible tube, and said patch contain a silicone-based resin.

12. The torso simulant of claim 1, wherein said at least one structure contains a silicone-based resin or a urethane-based resin.

13. The torso simulant of claim 1, further comprising:
   (g) a cover panel attachable to said mandrel to conceal a cavity defined by an interior surface along said mandrel.

14. The torso simulant of claim 1, wherein said at least one structure includes a stem extending from a flange, said at least one compressible tube attached to said stem so as to communicate said liquid into said at least one structure, said flange secured to said mandrel.

15. The torso simulant of claim 14, wherein said stem resides within a pocket disposed along said mandrel.

16. A method of fabricating a torso simulant for use as a training device comprising the steps of:
   (a) attaching a compressible tube to a mandrel, said compressible tube simulates a vascular element, said mandrel simulates a trunk;
   (b) covering said compressible tube and said mandrel with a plate, said plate partially covers said compressible tube and said mandrel;
   (c) placing a patch onto said plate and said mandrel, said patch completely covers said plate and partially covers an exterior surface along said mandrel;
   (d) securing said patch to said mandrel about a perimeter of said plate, said plate resides within a pocket formed between said patch and said mandrel; and
   (e) preventing a resin comprising a compressible layer from entering between said mandrel and said plate, said resin directly applied onto said patch and said mandrel.

17. The method of fabricating a torso simulant of claim 15, wherein an adhesive attaches said compressible tube to said mandrel in said attaching step.

18. The method of fabricating a torso simulant of claim 15, wherein an adhesive secures said patch to said mandrel in said securing step.

19. The method of fabricating a torso simulant of claim 15, wherein said patch prevents said resin from entering between said mandrel and said plate in said preventing step.

20. The method of fabricating a torso simulant of claim 15, wherein said securing step includes securing said patch to said compressible tube where said compressible tube traverses said perimeter.

* * * * *

UNITED STATES PATENT AND TRADEMARK OFFICE
CERTIFICATE OF CORRECTION

Page 1 of 1

PATENT NO. : 10,115,322 B2
APPLICATION NO. : 15/045295
DATED : October 30, 2018
INVENTOR(S) : David J. Parry, Jr. et al.

It is certified that error appears in the above-identified patent and that said Letters Patent is hereby corrected as shown below:

Column 12, (approx.) Line 52 Claim 17, Line 2; delete "15" and insert --16--

Column 12, (approx.) Line 54 Claim 18, Line 2; delete "15" and insert --16--

Column 12, (approx.) Line 57 Claim 19, Line 2; delete "15" and insert --16--

Column 12, (approx.) Line 60 Claim 20, Line 2; delete "15" and insert --16--

Signed and Sealed this
Eleventh Day of December, 2018

Andrei Iancu
*Director of the United States Patent and Trademark Office*